Feb. 12, 1935.    H. HARTEL    1,991,207
TIRE COVER
Filed June 20, 1929
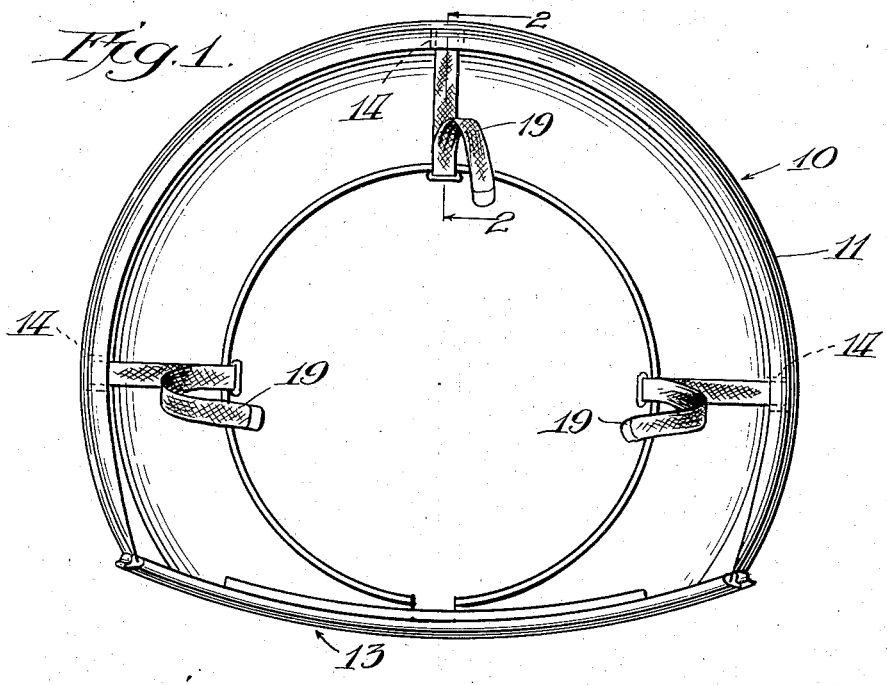
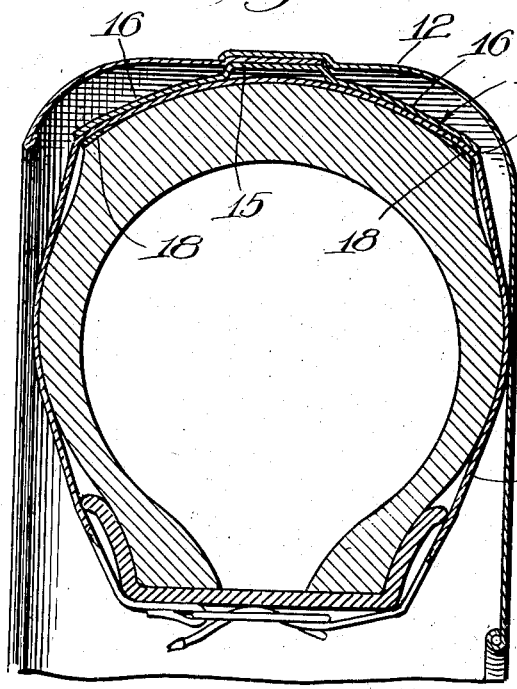
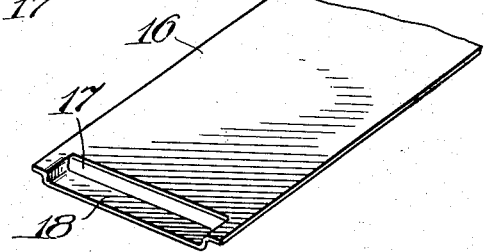
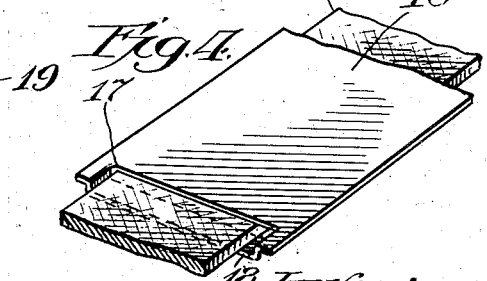
Inventor:
Herman Hartel
by Rector, Hibben, Davis & Macauley
attys Patented Feb. 12, 1935

1,991,207

UNITED STATES PATENT OFFICE 1,991,207

TIRE COVER

Herman Hartel, Milwaukee, Wis., assignor, by mesne assignments, to Lyon Incorporated, Detroit, Mich., a corporation of Delaware Application June 20, 1929, Serial No. 372,283

12 Claims. (Cl. 150—54)

My invention relates to tire covers.

The principal object of my invention is to provide a cover of the non-flexible type for encasing the spare tires of motor vehicles, which is characterized by ease of handling, both in application to and in removing from a tire, and in which securing means are arranged to provide for a close, non-rattling fit of the cover on the tire.

A further object is to provide a cover of the character described which presents an attractive appearance, simple in construction, and in which the securing means are wholly concealed when the cover is in position.

My invention is intended as a substitute for the flexible cover now in common use as a protective device for spare tires and is concerned more particularly with a metallic casing or one formed of any substantially non-flexible material, which has attaching means of a special design for securing the cover to the tire. For purpose of illustration, a cover will be described which is shaped for attachment to a car carried in a well on the running board or fender of a vehicle, but it will be understood that the application of the invention is not so limited, for it may be also utilized for tires carried in other locations.

These and further objects of my invention will be set forth in the following specification, reference being had to the accompanying drawing, and the novel means by which said objects are effectuated will be definitely pointed out in the claims.

In the drawing:

Figure 1 is a rear elevation of my improved tire cover, being viewed from the tire side of the cover;

Fig. 2 is a section along the line 2—2 in Fig. 1, showing the relation of the cover to a tire when mounted thereon;

Fig. 3 is a perspective view of one end of the bracket which supports the attaching strap;

Fig. 4 is a view similar to Fig. 3, but showing the relation of the attaching strap to the bracket when in position.

The numeral 10 designates a casing which is preferably formed of metal or of any non-flexible material and which is arranged as at 11 to conform to the circumferential shape of the tire, as at 12 to conform to the transverse tread profile generally of the tire, and as at 13 to conform to the running board or fender of the vehicle. The precise shape, or the manner of forming the tire casing, forms no part of my invention, the particular shape indicated in Fig. 1 being merely representative of any operating environment.

Arranged around the inner peripheral surface of the casing 10 is a plurality of strap brackets 14, each of which is in the form of a strip which is symmetrically positioned transversely with respect to the center line of the tire tread and secured at the mid-portion thereof, as at 15, to the casing 10 by means of spot welding, riveting, or in any other approved manner. Said strip is preferably formed of a bendable, or generally flexible, material, which fact together with its mode of securement to the casing 10 provides a pair of movable arms 16, each of which is slit as at 17 adjacent the end thereof and the portion of each end between said slits and the extreme end of the strip is offset as at 18 out of the plane of the arm 16. A suitable strap 19 is looped through the openings 17 across each strip for the purpose of encircling the tire section and effectively securing the casing in position.

The flexible nature of the strips 14, which renders them conformable to the tread profile of the tire when subjected to the binding action of the strap 19, and also the fact that each strap is carried by its corresponding strip 14 at points displaced on opposite sides of the tire tread provides for a very close, non-rattling fit of the cover on the tire. This principal objection to tire covers of this character is accordingly avoided. It will be observed that, owing to the off-set portion 18 in each strip 14, the strap 19 in being looped across said strips is not subjected to any sharp bend, or the cutting effect of sharp edges of the strips, a factor which will greatly lengthen the life of the strap. Further, the arrangement of the strips 14 and the strap 19 within the casing 10 is such that these elements are completely concealed with manifest advantages from the standpoint of appearance.

While I have shown one set of elements and combinations thereof for effectuating my improved tire cover, it will be understood that the same is intended for purpose of illustration only and in nowise to restrict my device to the exact form and structures shown, for many changes may be made therein without departing from the spirit of my invention.

I claim:

1. A tire cover comprising a single covering unit adapted to be applied to and removed from a tire as a whole and to cover the tread of the tire, means for securing the unit upon the tire and including flexible metallic strip members secured to said unit and adjustably conformable to the transverse tread profile of the tire, and means supported thereby and attachable to the tire to conform the strip members to the tire tread profile.

2. In a tire cover, the combination of a single-unit casing, means secured to the inner peripheral surface thereof, and extending across in contact with and conforming to the transverse tread profile of the tire to seat the cover upon the tire, and strap members secured to the ends of said means to conform the latter to the tire for attachment of the cover to a tire.

3. In a tire cover, the combination of a single-unit casing, flexible strips secured at their mid-portions to the inner peripheral surface of said casing and extending along and conforming to the transverse tread curvature of the tire, said strip having openings at the ends thereof, and strap members secured to said strips through said openings for attachment to a tire.

4. In a tire cover, the combination of a single-unit casing, strips secured at their mid-portions to the inner peripheral surface of said casing and including openings at the ends thereof, and strap members looped through said openings across said strips for attachment to a tire.

5. In a tire cover, the combination of a casing, flexible strips secured at their mid-portions to the inner peripheral surface of said casing and including openings at the ends thereof, and strap members looped through said openings across said strips for attachment to a tire.

6. A tire cover comprising a single-unit casing adapted to be applied to and removed from the tire as a whole, means for securing the casing upon the tire including flexible members for supporting means attachable to a tire, said members being secured at their mid-portions to said casing to provide movable end portions disposed on opposite sides of the center line of the tire tread, and means supported by said end portions arranged for attachment to the tire.

7. In a tire cover, the combination of a casing, strips secured at their mid-portions to the inner peripheral surface of said casing and including openings at the ends thereof, the portion of each of said strips between said openings and the ends thereof being offset out of the plane of said strips, and strap members looped through said openings across said strips for attachment to a car.

8. In a tire cover, a single-unit body portion shaped to the transverse and circumferential curvature of the tire and adapted to cover the tread and front face portions of the tire, and means for securing and adjustably seating the cover upon the tire comprising an attachment member extending transversely of the tire tread and connected to the underside of the tread portion of said body and concealed thereby, and flexible means secured to said member and detachably engageable with the tire.

9. In a single-unit metal tire cover, a body having integrally-joined side-wall-covering and tread-covering parts, flexible fastening element extending transversely of the tire tread and secured to the underside of said tread-covering part of said body where it is concealed when the cover is upon the tire, and a flexible member supported by the ends of said element and passing along the tread part of the tire under the cover and engageable with the side portion of the tire opposite said side-wall-covering part of the cover to secure the cover upon the tire, providing a plain unobstructed outer surface conforming throughout to the general shape of the covered portions of the tire.

10. In a single-unit metal tire cover, a covering body of L-like-shape in cross section to approximate the general shape of one face and the tread portion of the tire, a flexible, strap-like metallic fastening member secured to and concealed by the underside of said body above the tread portion of the tire, said member being adapted to conform to the shape of and to seat upon the tire, a flexible securing element detachably connected to said member and extending rearwardly over and detachably engaging the face of the tire opposite the face-covering portion of said body whereby said fastening member is caused to conform to the shape of the tire and the cover is adjustably secured to the tire with its outer surface unobstructed.

11. In combination with means attachable to a spare tire for supporting a cover thereon, a tire cover comprising a single unit casing adapted to be applied to and removed from the tire as a whole, means for securing the cover upon the tire, said means having provision for carrying the attachable means at points arranged on opposite sides of the tire tread when the cover is in proper tire protecting position, said second means being yieldable whereby to enable the cover to be adjustably mounted upon the tire.

12. A tire cover comprising a form-retaining arcuate body shaped to cover a side wall and tread of a tire, and means for adjustably supporting said body in spaced relation to and about the tread, said means comprising tread engaging springs secured to circumferentially spaced portions of the tread covering part of said cover to enable the cover to accommodate tires of different sizes, said springs being so arranged as to exert pressure during such engagement to thereby adjust the cover on the tire, and means connected to said springs and cooperating therewith to wrap about the tire and thereby positively secure the cover to the tire.

HERMAN HARTEL.